US010388430B1

(12) United States Patent
Evans

(10) Patent No.: US 10,388,430 B1
(45) Date of Patent: Aug. 20, 2019

(54) HYBRID CABLE FOR USE IN AERIAL APPLICATIONS

(71) Applicant: Superior Essex International LP, Atlanta, GA (US)

(72) Inventor: Christopher Robert Evans, Kennesaw, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 16/142,844

(22) Filed: Sep. 26, 2018

(51) Int. Cl.
| H01B 9/00 | (2006.01) |
| H01B 7/02 | (2006.01) |
| H01B 7/17 | (2006.01) |
| G02B 6/44 | (2006.01) |

(52) U.S. Cl.
CPC .......... *H01B 9/005* (2013.01); *G02B 6/4434* (2013.01); *H01B 7/0275* (2013.01); *H01B 7/17* (2013.01); *H01B 9/003* (2013.01)

(58) Field of Classification Search
CPC ........ H01B 9/005; H01B 7/0275; H01B 7/17; H01B 9/003; G02B 6/4434
USPC ...................................................... 174/70 R
See application file for complete search history.

(56) References Cited

U.S. PATENT DOCUMENTS

| 3,980,808 | A | * | 9/1976 | Kikuchi | ................. | H01B 7/182 |
| | | | | | | 174/110 SR |
| 5,246,783 | A | | 9/1993 | Spenadel et al. | | |
| 6,496,629 | B2 | | 12/2002 | Ma et al. | | |
| 6,714,707 | B2 | | 3/2004 | Rossi et al. | | |
| 2002/0027014 | A1 | * | 3/2002 | Mukoyama | ............ | H01B 12/02 |
| | | | | | | 174/125.1 |
| 2006/0118322 | A1 | | 6/2006 | Wiekhorst et al. | | |
| 2016/0147028 | A1 | | 5/2016 | Kumar et al. | | |
| 2016/0148725 | A1 | | 5/2016 | Flory et al. | | |
| 2016/0353617 | A1 | | 12/2016 | Gimblet et al. | | |
| 2016/0356974 | A1 | | 12/2016 | Bringuier et al. | | |
| 2017/0276891 | A1 | | 9/2017 | Esseghir et al. | | |
| 2018/0247733 | A1 | * | 8/2018 | Mann | ........................ | B64F 1/34 |
| 2018/0268961 | A1 | * | 9/2018 | Kim | ....................... | H01B 13/22 |

OTHER PUBLICATIONS

Office Action, dated Jan. 8, 2019, for the U.S. Appl. No. 16/142,848.

* cited by examiner

*Primary Examiner* — Timothy J Thompson
*Assistant Examiner* — Charles Pizzuto

(57) ABSTRACT

A cable may include a central strength member, a plurality of optical fiber buffer tubes positioned around the central strength member, and a jacket surround the plurality of buffer tubes and the central strength member. The central strength member may include a plurality of longitudinally extending and twisted conductive components. Each conductive component may include an inner conductor, a dielectric strength member formed around the inner conductor and having a tensile strength of at least 10,000 MPa, and an outer conductor formed around the dielectric strength member. The inner and outer conductor may form a balanced pair of conductors.

20 Claims, 1 Drawing Sheet

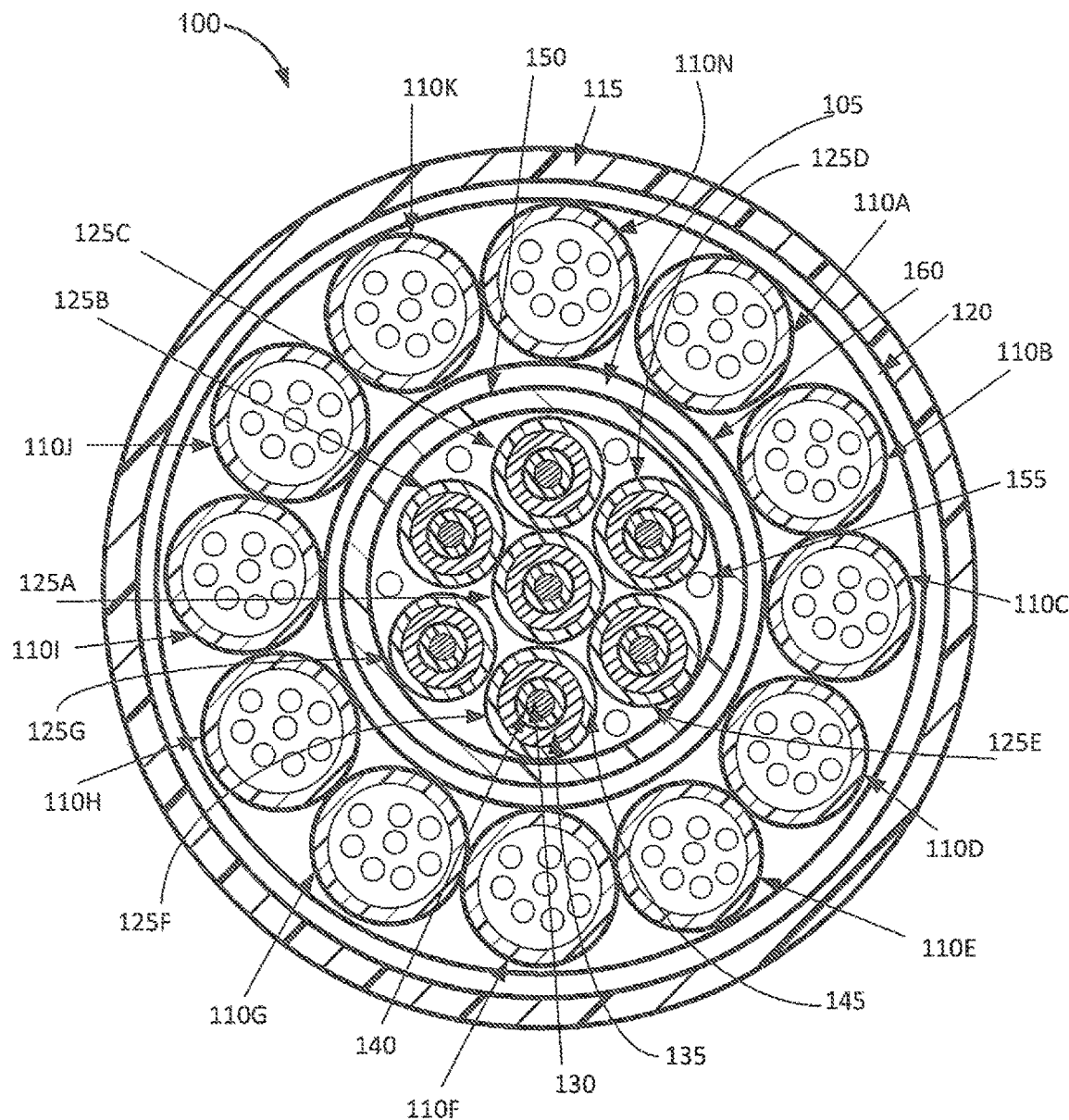

HYBRID CABLE FOR USE IN AERIAL APPLICATIONS

CROSS-REFERENCE TO RELATED APPLICATION

This application is related to pending U.S. patent application Ser. No. 16/142,848, filed Sep. 26, 2018 and entitled "Coaxial Cable and Method for Forming the Cable," the contents of which is incorporated herein by reference in its entirety.

TECHNICAL FIELD

Embodiments of the disclosure relate generally to hybrid cables that include both optical fiber and electrically conductive transmission media and, more particularly, to hybrid cables suitable for aerial applications.

BACKGROUND

Hybrid cables are utilized in a wide variety of applications that require the transmission of both power and communication signals. Certain applications require hybrid cables to be installed in aerial locations or in similar locations in which a cable must be capable of supporting its own weight or load. In aerial applications, a cable is typically suspended between two poles or other points, thereby subjecting the cable to tensile stresses and environmental stresses (e.g., temperature stresses, wind, snow, ice, etc.). These stresses can lead to increased optical fiber attenuation and negatively impact cable performance. In order to address aerial applications, certain cables include messenger or suspension wires that help to support the cable's load; however, these wires increase installation cost and may attract lightning.

To avoid messenger wires, certain optical fiber cables have been developed in which optical fibers are positioned within loose buffer tubes that are stranded around a central strength member. Aramid yarns are then wrapped around the buffer tubes in order to support the weight of the cable over suspended areas. However, central strength members are typically formed from strength rods that do not include conductors suitable for transmission of power and/or other signals. Other cables include a plurality of optical fiber buffer tubes stranded around one or more conductors, such as a plurality of twisted pair conductors. However, the twisted pair conductors do not provide sufficient support for bearing the cable load in an aerial application, thereby necessitating the use of separate strength members. The incorporation of separate strength members results in larger cables and increased material cost. Accordingly, there is an opportunity for improved hybrid cables suitable for use in aerial applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

FIG. 1 depicts a cross-sectional view of an example hybrid cable suitable for use in aerial applications, according to an illustrative embodiment of the disclosure.

DETAILED DESCRIPTION

Various embodiments of the present disclosure are directed to hybrid cables that are suitable for deployment in aerial applications and/or in other applications in which it is desirable for a cable to bear its own load weight or in which a cable is subjected to tensile forces. In certain embodiments, a cable may include a central strength member ("CSM"), and a plurality of buffer tubes may be stranded or otherwise positioned around the CSM. Each buffer tube may be configured to house one or more optical fibers (e.g., loose fibers, optical fiber ribbons, etc.) and/or other suitable transmission media. An outer jacket may be formed around the CSM and the buffer tubes.

According to an aspect of the disclosure, the CSM may include a plurality of longitudinally extending conductive components. For example, the CSM may include a plurality of helically twisted or S-Z stranded conductive components. Any number of conductive components may be incorporated into the CSM as desired, such as between four and fifty components. Each conductive component may include an inner conductor and an outer conductor coaxially arranged around the inner conductor. Additionally, the inner and outer conductors may be formed as a balanced pair of conductors. For example, the direct current resistances of the inner and outer conductors may be matched or approximately equal. As a result, the inner and outer conductors may function in a similar manner as twisted pair conductors utilized in conventional hybrid cables. In certain embodiments, one or more suitable longitudinally extending wraps may be wrapped or positioned around the plurality of conductive components.

Further, according to an aspect of the disclosure, a dielectric strength member may be positioned between the inner and outer conductors. In other words, the dielectric strength member may be formed around the inner conductor, and the outer conductor may be formed around the dielectric strength member. The dielectric strength members incorporated into the plurality of conductive components may provide structural and/or anti-buckling support for the hybrid cable. For example, the dielectric strength members may permit the hybrid cable to be implemented in aerial or suspended applications in which the cable must be capable of supporting its own weight or load. In certain embodiments, each dielectric strength member may have a tensile strength of at least 10,000 MPa.

A dielectric strength member may be formed from a wide variety of materials and/or combinations of materials. For example, a dielectric strength member may be formed from glass reinforced plastic or basalt fiber. In certain embodiments, the dielectric strength member may be formed with a longitudinally extending cavity, and the inner conductor of a conductive component may be positioned within the cavity. Additionally, a wide variety of suitable methods or techniques may be utilized to form a dielectric strength member. For example, glass fibers may be positioned around an inner conductor, and a polymeric resin (e.g., a polymer matrix resin, etc.) may be applied to the glass fibers in order to form a dielectric strength member with an inner conductor positioned within an internal cavity or channel.

As a result of forming a CSM from a plurality of conductive components that include a combination of conductors and a dielectric strength member, the CSM may provide desired structural support for a hybrid cable. Additionally, the conductors of the conductive components may be utilized to transmit or desired power and/or communications signals. A resulting hybrid cable that include buffer tubes formed around the CSM may also be formed with a relatively small outer diameter. In other words, the unique CSM design may permit a hybrid cable to be formed that is smaller than conventional hybrid cables, such as conventional hybrid cables in which buffer tubes are positioned around a plurality of twisted pairs of conductors.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 depicts a cross-sectional view of an example hybrid cable 100, according to an illustrative embodiment of the disclosure. As a hybrid cable, the cable 100 may include a plurality of different types of transmission media. For example, the cable 100 may include a combination of metallic conductors and optical fibers. The metallic conductors may be suitable for transmitting electrical, power, and/or data signals, and the optical fibers may be suitable for transmitting relatively high speed data signals. The cable 100 may be suitable for use in a wide variety of applications. For example, the cable 100 may be suitable for use in aerial, indoor/outdoor, OSP, buried, and/or vertical rise applications. In certain embodiments, the cable may be suitable for use in applications in which the cable 100 is required to support its own load or weight, such as aerial and/or suspended applications.

As illustrated in FIG. 1, the cable 100 may include a central strength member ("CSM") 105 or a core component, and a plurality of optical fiber components, such as a plurality of buffer tubes 110A-N, formed or positioned around the CSM 105. An outer jacket 115 may then enclose the core component 105, the buffer tubes 110A-N, and other internal components of the cable 100. In certain embodiments, one or more suitable outer layers 120 (e.g., water blocking layers, strength layers, etc.) may be formed between the buffer tubes 110A-N and the outer jacket 115. Each of these components, as well as additional components that may optionally be incorporated into the cable 100, are described in greater detail below.

The CSM 105 may be formed as a central component of the cable 100. The CSM 105 may provide strength and structural support for the cable 100 and the other components of the cable 100. For example, the CSM 105 may provide desired tensile and/or compressive strength that supports the axial load of cable 100 and assists in preventing or limiting attenuation within the optical fibers housed within the buffer tubes 110A-N. In certain embodiments, the CSM 105 may also assist the cable 100 in resisting thermal expansion and contraction.

According to an aspect of the disclosure, the CSM 105 may include a plurality of conductive components 125A-G. Any number of conductive components 125A-G may be incorporated into a CSM 105 as desired in various embodiments. For example, the CSM 105 may include between approximately four and approximately fifty conductive components. Other suitable numbers of conductive components may be utilized as desired. In various embodiments, the CSM 105 may include 4, 5, 6, 8, 10, 12, 15, 20, 25, 30, 35, 40, 45, or 50 conductive components, a number of conductive components included in a range between any two of the above values, or a number of conductive components included in a range bounded on either a minimum or maximum end by one of the above values.

In certain embodiments, the plurality of conductive components 125A-G may be twisted or stranded together. For example, the plurality of conductive components 125A-G may be helically twisted or stranded together along a longitudinal direction. As another example, the plurality of conductive components 125A-G may be S-Z stranded together along a longitudinal direction. As desired in certain embodiments, one or more additional components may be twisted or stranded with the conductive components 125A-G in the CSM 105. In certain embodiments, one or more strength yarns or other suitable strength members may be twisted and/or stranded with the plurality of conductive components 125A-G. For example, one or more strength members (e.g., strength yarns, etc.) may be positioned within the interstices between conductive components 125A-G and/or around an outer periphery of the plurality of conductive components 125A-G (e.g., between the conductive components 125A-G and an outer wrap 150).

Each conductive component (generally referred to as conductive component 125) may include an inner conductor 130 and an outer conductor 135 positioned or formed around the inner conductor 130. In certain embodiments, the inner conductor 130 and the outer conductor 135 may be arranged in a coaxial arrangement having a common axis that extends along a longitudinal direction of the cable 100. Additionally, according to an aspect of the disclosure, a dielectric strength member 140 may be positioned between the inner conductor 130 and the outer conductor 135. As desired, suitable insulation 145 may be formed around the outer conductor 135 to facilitate electrical isolation between the conductive component 125 and one or more adjacent conductive components and/or other components of the CSM 105.

The inner conductor 130 may be formed from any suitable electrically conductive material, such as copper, aluminum, silver, annealed copper, gold, a conductive alloy, conductive composite materials, carbon nanotubes, etc. Indeed, suitable electrically conductive materials may include any material having an electrical resistivity of less than approximately $1\times10^{-7}$ ohm meters at approximately 20° C., such as an electrical resistivity of less than approximately $3\times10^{-8}$ ohm meters at approximately 20° C. Additionally, the inner conductor 130 may have any suitable diameter, gauge, cross-sectional area, and/or other dimensions. In certain embodiments, the inner conductor 130 may be sized in order to facilitate transmission of a desired power signal. In this regard, a conductive component 125 or any combination of two or more of the plurality of conductive components 125A-G may be utilized to transmit a desired power signal. Further, the inner conductor 130 may be formed as either a solid conductor or as a conductor that includes a plurality of conductive strands that are twisted together.

The outer conductor 135 may also be formed from any suitable electrically conductive material, such as copper, aluminum, silver, annealed copper, gold, a conductive alloy, conductive composite materials, carbon nanotubes, etc. Indeed, suitable electrically conductive materials may include any material having an electrical resistivity of less than approximately $1\times10^{-7}$ ohm meters at approximately 20° C., such as an electrical resistivity of less than approximately $3\times10^{-8}$ ohm meters at approximately 20° C. The outer conductor 135 may also be formed with a wide variety of suitable dimensions, such as any suitable thickness, cross-sectional area, etc.

A wide variety of suitable techniques and/or processes may be utilized to form an outer conductor 135 as desired in various embodiments. In certain embodiments, the outer conductor 135 may be formed as a foil that is wrapped or otherwise positioned around the inner conductor 130 and the dielectric strength member 140. In other embodiments, a plurality of layers of electrically conductive material (e.g., stacked layers of metallic foil, etc.) may be utilized to form the outer conductor 135. In yet other embodiments, electrically conductive material may be pressed, bent, cut, or otherwise mechanically shaped in order to form an outer conductor 135 that can be coaxially arranged around the inner conductor 130.

In other embodiments, a plurality of electrically conductive strands (e.g., metallic strands, etc.) may be utilized to form the outer conductor 135. For example, one or more rings of electrically conductive strands or separate conductive components may be arranged or positioned around the inner conductor 130 and the dielectric strength member 140 in order to form the outer conductor 135. In yet other embodiments, electrically conductive strands (e.g., metallic strands, etc.) may be combined either together or optionally with strands of other material in order to form a longitudinally continuous braided layer that may be utilized as the outer conductor 135. In yet other embodiments, one or more electrically conductive layers (e.g., a metallic foil, metallic ink or paid, liquid metal, etc.) may be combined with one or more base or dielectric layers in order to form an outer conductor 135 that may be coaxially arranged around the inner conductor 130. Other suitable outer conductor constructions may be utilized as desired in other embodiments.

Additionally, the outer conductor 135 may be formed with a wide variety of suitable dimensions, such as any suitable thickness, and/or cross-sectional area. In certain embodiments, one or more dimensions of the outer conductor 135 may be selected such that the outer conductor 135 has a direct current resistance that is matched or approximately equal to that of the inner conductor 130. Additionally, one or more dimensions of the outer conductor 135 may be based at least in part upon the materials utilized to form the outer conductor 135 such that a desired DC resistance and/or power transmission capability may be attained.

In certain embodiments, an inner conductor 130 may be utilized to transmit or propagate a power signal over the conductive component 125, and the outer conductor 135 may be utilized as a return conductor or a return path for the power signal. In other embodiments, the outer conductor 135 may be utilized to transmit a power signal while the inner conductor 130 serves as a return path. Additionally, in certain embodiments, the inner and outer conductors 130, 135 may be formed as a balanced pair of conductors. For example, the direct current ("DC") resistances and/or the power capacities of the inner and outer conductors 130, 135 may be matched or approximately equal. As a result, the inner and outer conductors 130, 135 may function in a similar manner as twisted pair conductors utilized to transmit power in conventional hybrid cables. As desired in other embodiments, the conductors 130, 135 of one or more conductive components 125A-G may be utilized to transmit communications signal as an alternative to or in addition to transmitting power signals.

With continued reference to the conductive component 105, a dielectric strength member 140 or dielectric strength layer may be positioned between the inner conductor 130 and the outer conductor 135. For example, the dielectric strength member 140 may be formed around the inner conductor 130, and the outer conductor 135 may be formed around the dielectric strength member 140. The dielectric strength member 140 may function as insulation between the two conductors 130, 135. Additionally, the dielectric strength member 140 may provide structural and/or anti-buckling support for the hybrid cable 100.

The dielectric strength member 140 may be formed from a wide variety of suitable materials and/or combinations of materials. In certain embodiments, the dielectric strength member 140 may be formed from glass reinforced plastic ("GRP"). In other embodiments, the dielectric strength member may be formed from basalt fiber. Additionally, according to an aspect of the disclosure, the dielectric strength member 140 may have a tensile strength of at least 10,000 MPa. In other embodiments, the dielectric strength member 140 may have a tensile strength of approximately 1,000, 2000, 2,500, 3,000, 4,000, 5,000, 7,500, 8,000, 9,000, 10,000, 12,000, 15,000, 18,000, or 20,000 MPa, a tensile strength included in a range between any two of the above values, or a tensile strength included in a range bounded on a minimum end by one of the above values.

A wide variety of suitable methods and/or techniques may be utilized to form the dielectric strength member 140. In certain embodiments, an inner conductor 130 may be provided, and the dielectric strength member 140 may be formed around the inner conductor 130. For example, a plurality of fibers, such as glass fibers, may be positioned around the inner conductor 130. The fibers may be held in place using a wide variety of suitable techniques, such as adhesives, electrostatic cling, etc. As another example, fibers may be helically wrapped or wound around the inner conductor 130. A polymeric resin, such as a polymer matrix resin, may then be applied on or over the glass fibers in order to form a GRP dielectric strength member 140 around the inner conductor 130. A wide variety of suitable polymeric resins may be utilized as desired, such as epoxy, vinylester, polyester, polyurethane, and/or silicone. Once formed, the dielectric strength member 140 may include a longitudinally extending internal channel or cavity in which the inner conductor 130 is positioned. In other embodiments, the dielectric strength member 140 may be separately formed or molded to include a longitudinally extending cavity. The inner conductor 130 may then be positioned within the cavity. In yet other embodiments, the dielectric strength member 140 may be formed from a plurality of relatively thin layers of GRP material having a combined thickness that corresponds to a desired thickness of the dielectric strength member 140. The relatively thin layers of GRP material may be curled or wrapped around the inner conductor 130 along a longitudinal direction.

The dielectric strength member 140 may also be formed with a wide variety of suitable dimensions, such as any suitable thickness and/or cross-sectional area. In certain embodiments, a thickness and/or other dimensions of the dielectric strength member 140 may be based at least in part on the dimensions of the inner and/or outer conductors 130, 135 and/or a desired separation distance between the two conductors 130, 135. Additionally, in various embodiments, a thickness and/or other dimensions of the dielectric strength member 140 may be based at least in part upon a desired tensile strength for the dielectric strength member 140 and/or a conductive component 125 incorporating the dielectric strength member 140.

In certain embodiments, a dielectric strength member 140 may be formed as a solid component or as a solid layer between the inner conductor 130 and the outer conductor 135. In other embodiments, the dielectric strength member 140 may be formed with spaces between a plurality of sections or components of the dielectric strength member 140. For example, the dielectric strength member 140 may be formed in a plurality of sections that are radially spaced around an outer circumstance of the inner conductor 130. In other words, the dielectric strength member 140 may be formed as a plurality of spokes that extend between the inner conductor 130 and the outer conductor 135. As desired, the dielectric strength member 140 may additionally include a solid layer adjacent to the inner conductor 130 and/or a solid layer adjacent to the outer conductor 135 (e.g., one or more solid layers positioned at the end(s) of the spokes). Spaces between adjacent spokes or sections may be filled with any desirable material, such as air, another gas, a filling compound, etc.

As another example, the dielectric strength member 140 may be formed as a layer that spirals around the inner conductor 130 along a longitudinal direction. As desired, spaces may be formed between adjacent wrappings of the spiral. As yet another example, the dielectric strength member 140 may include a plurality of components that spiral around the inner conductor 130, such as two or more spirals that are longitudinally offset from one another. A wide variety of other configurations may be utilized to form a dielectric strength member that incorporates spaces or gaps between a plurality of sections or components.

As a result of incorporating respective dielectric strength members into the plurality of conductive components 125A-G, the plurality of conductive components 125A-G may provide structural and/or anti-buckling support for the hybrid cable 100. For example, the use of dielectric strength members may permit the hybrid cable 100 to be implemented in aerial or suspended applications in which the cable must be capable of supporting its own weight or load.

With continued reference to the conductive component 125, insulation 145 may be formed around the outer conductor 135. The insulation 145 may provide electrical isolation between the conductive component 125 and one or more adjacent conductive components. Additionally, the insulation 145 may provide protection for the internal components of the conductive component 125. The insulation 145 may include any suitable dielectric materials and/or combination of materials. Examples of suitable dielectric materials include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins, a low smoke zero halogen ("LSZH") material, etc.), nylon, polyurethane, neoprene, cholorosulphonated polyethylene, flame retardant PVC, low temperature oil resistant PVC, flame retardant polyurethane, flexible PVC, or a combination of any of the above materials.

In various embodiments, the insulation 145 may be formed from one or multiple layers of insulation material. A layer of insulation may be formed as solid insulation, unfoamed insulation, foamed insulation, or other suitable insulation. As desired, a combination of different types of insulation may be utilized. For example, a foamed insulation layer may be covered with a solid foam skin layer. Additionally, the insulation 145 may be formed with any suitable thickness, inner diameter, outer diameter, and/or other dimensions. As desired in various embodiments, insulation 145 may additionally include a wide variety of other materials (e.g., filler materials, materials compounded or mixed with a base insulation material, etc.), such as smoke suppressant materials, flame retardant materials, etc. Additionally, in certain embodiments, the insulation of each of the conductive components 125A-G may be formed from similar materials. In other embodiments, at least two of the conductive components 125A-G may utilize different insulation materials.

As set forth in greater detail above, a plurality of conductive components 125A-G may be incorporated into a CSM 105. In certain embodiments, one or more suitable outer wraps 150 or layers may be formed around the plurality of conductive components 125A-G. For example, one or more suitable longitudinally extending wraps may be wrapped or positioned around the plurality of conductive components 125A-G. An outer wrap 150 may assist in maintaining the positions of the conductive components 125A-G and/or holding the twisted conductive components 125A-G together. In certain embodiments, the outer wrap 150 may also assist in limiting the migration of any other internal components of the CSM 105, such as any internal strength yarns, a filling compound, etc.

In certain embodiments, the outer wrap 150 may be formed as a jacket layer, such as an extruded jacket layer. As such, the outer wrap 150 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene- chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the outer wrap 150 may also include flame retardant materials, smoke suppressant materials, and/or other suitable additives. Additionally, the outer wrap 150 may include a single layer or, alternatively, multiple layers of material (i.e., multiple layers of the same material, multiple layers of different materials, etc.).

In other embodiments, the outer wrap 150 may be formed as one or more binder threads that may be helically or contra helically wrapped around the plurality of conductive components 125A-G. In yet other embodiments, the outer wrap 150 may be a single or multi-layer wrap that is longitudinally curled around the conductive components 125A-G. For example, the outer wrap 150 may be formed as a suitable single or multi-layer tape. As desired, a tape may be bonded, adhered, ultrasonic welded, or otherwise affixed to itself (e.g., affixed with mechanical fasteners, etc.) after it is wrapped or curled around the conductive components 125A-G. In other embodiments, a tape may be helically twisted around the conductive components 125A-G. As desired, adjacent helical wrappings may overlap one another along a longitudinal length such that the conductive components 125A-G are enclosed.

An outer wrap 150 that is formed as a tape may include a wide variety of suitable materials and/or combinations of materials. For example, a tape may include one or more polymeric materials, one or more polyolefins (e.g., polyethylene, polypropylene, etc.), one or more fluoropolymers (e.g., fluorinated ethylene propylene ("FEP"), one or more polyesters, polyethylene-terephthalate, mylar, or a combination of any of the above materials. Additionally, a tape may include any number of suitable layers. As desired, water blocking, flame retardant, and/or other layers and/or materials may be incorporated into a tape.

Additionally, an outer wrap 150 may be formed with a wide variety of suitable dimensions as desired in various embodiments. For example, the outer wrap 150 may be formed with any suitable thickness, inner diameter, outer diameter, and/or width (e.g., for tapes, etc.). In certain embodiments, a width may be selected such that a tape wrap 150 may be longitudinally curled around the conductive components 125A-G in order to enclose or surround the conductive components 125A-G.

Regardless of the construction utilized to form an outer wrap 150, in certain embodiments, the outer wrap 150 may be formed from all dielectric materials. In other embodiments, the outer wrap 150 may incorporate shielding material, such as electrically conductive shielding material. For example, the outer wrap 150 may include a layer of electrically conductive material formed on a dielectric layer or between two dielectric layers. In other embodiments, the outer wrap 150 may include water blocking materials. Indeed, the outer wrap 150 may include any suitable number of layers, and each layer may be formed from a wide variety of suitable materials.

In certain embodiments, one or more strength members 155 may be incorporated into the CSM 105 (e.g., under or within the outer wrap 150). For example, a plurality of strength yarns may be incorporated into the CSM 105. Strength yarns may be relatively flexible and/or relatively light weight strength members. A wide variety of suitable strength yarns may be utilized as desired including, but not limited to, aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, etc.

The strength members 155 may be positioned in a wide variety of locations within the CSM 105. For example, the strength members 155 may be positioned in the interstices between the conductive components 125A-G and/or other internal components. The strength members 155 may also be positioned between the conductive components 125A-G and an inner surface of the outer wrap 150. In certain embodiments, the strength members 155 may extend in a longitudinal direction parallel to other internal components of the CSM 105, such as the conductive components 125A-G. In other words, the strength members 155 may extend approximately parallel to a longitudinal length of the cable 100. In other embodiments, the strength members 155 or subsets of the strength members may be helically twisted with, S-Z stranded with, and/or wrapped around one or more components of the CSM 105, such as the conductive components 125A-G.

In certain embodiments, the CSM 105 may be formed as a "dry" component that does not include any filling compound. In other embodiments, a suitable filling compound may also be incorporated into the cable CSM 105, for example, within an outer wrap 150. A wide variety of suitable filling compounds may be utilized as desired. A filling compound may provide mechanical protection (e.g., cushioning, etc.) and water penetration protection or water blocking to the conductive components 125A-G.

Additionally, in certain embodiments, a strength layer 160 may optionally be formed around the CSM 105 and/or incorporated into an outer wrap 150. For example, one or more strength yarns or other strength members may be wrapped or otherwise positioned around the CSM 105. A wide variety of suitable strength yarns may be utilized as desired including, but not limited to, aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, etc. Other suitable strength members may be utilized as desired in other embodiments.

With continued reference to FIG. 1, the cable 100 may include a plurality of optical fiber components positioned around the CSM 105. For example, in certain embodiments, a plurality of buffer tubes 110A-N may be positioned around the CSM 105. Each buffer tube (generally referred to as buffer tube 110) may be a suitable sheath configured to house one or more optical fibers. In certain embodiments, each buffer tube 110 may be formed as a loose tube. In other words, the optical fibers may be loosely positioned within the buffer tube 110. As desired, a plurality of optical fibers may be arranged into one or more suitable bundles or groupings. In other embodiments, a plurality of optical fibers may be incorporated into one or more ribbons and/or a ribbon stack.

The buffer tube 110 may be formed from any suitable materials or combinations of materials. Examples of suitable materials include, but are not limited to, various polymers or polymeric materials, acrylate or acrylics (e.g., acrylic elastomers, etc.), polyvinyl chloride ("PVC"), polyurethane, a fluoropolymer, polyethylene, neoprene, polyvinylidene fluoride ("PVDF"), polybutylene terephthalate ("PBT"), ethylene, plastic, or other appropriate materials or combinations of suitable materials. Additionally, the buffer tube 110 may be formed as either a single layer or a multiple layer buffer tube. In the event that multiple layers are utilized, the layers may all be formed from the same material(s) or, alternatively, at least two layers may be formed from different materials or combination of materials. For example, at least two layers may be formed from different polymeric resins. As another example, a flame retarding or other suitable additive may be incorporated into a first layer but not into a second layer. Further, the buffer tube 110 may have any suitable inner and/or outer diameters as desired in various applications. For example, the buffer tube 110 may be appropriately sized to house a desired number of optical fibers and/or any other components incorporated into the buffer tube 110.

Any suitable number of buffer tubes 110A-N may be incorporated into the cable 100 as desired in various embodiments. In certain embodiments, a number of utilized buffer tubes 110A-N may be based at least in part upon the size of the CSM 105 and/or the size of the buffer tubes. For example, a desired number of buffer tubes may be utilized in order to result in the cable 100 having a desired cross-sectional shape, such as a circular shape. In certain embodiments, the buffer tubes 110A-N may be helically wrapped around the CSM 105 with any suitable twist lay. In other embodiments, the buffer tubes 110A-N may be S-Z stranded around the CSM 105. In yet other embodiments, the buffer tubes 110A-N may longitudinally extend parallel to the CSM 105.

Additionally, in certain embodiments, the plurality of buffer tubes 110A-N may be positioned in one or more rings around the CSM 105. FIG. 1 illustrates an example cable 100 in which the plurality of buffer tubes 110A-N are positioned in a single ring around the CSM 105. In other embodiments, a plurality of rings of buffer tubes may be positioned around the CSM 105. Further, even if the plurality of buffer tubes 110A-N are helically twisted or S-Z stranded, in certain embodiments, the CSM 105 may be surrounded by one or more rings of buffer tubes 110A-N at any given cross-sectional location along a longitudinal length of the cable 100. In other words, the one or more rings of buffer tubes 110A-N may surround the CSM 105 at any given cross-sectional location along the longitudinal length.

As desired in various embodiments, one or more spacers, fillers, or other components may be utilized in place of one or more of the buffer tubes 110A-N. Alternatively, one or more empty buffer tubes may be utilized. Spacers, fillers, and/or empty buffer tubes may be utilized to provide the cable 100 with a desired overall cross-sectional shape or geometry.

Any suitable number of optical fibers may be housed within each buffer tube 110. Further, in certain embodiments, each of the plurality of buffer tubes 110A-N may house the same number of optical fibers. In other embodiments, at least two of the plurality of buffer tubes may house a different number of optical fibers. Each optical fiber may be a single mode fiber, multi-mode fiber, pure-mode fiber, polarization-maintaining fiber, multi-core fiber, or some other optical waveguide that carries data optically. Additionally, each optical fiber may be configured to carry data at any desired wavelength (e.g., 1310 nm, 1550 nm, etc.) and/or at any desired transmission rate or data rate. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness. In certain embodiments, an optical fiber may include a core that is surrounded by a cladding. Additionally, one or more suitable coatings may surround the cladding.

As desired, a wide variety of other components may optionally be incorporated into a buffer tube 110 included, but not limited to, a water blocking tape, one or more strength yarns, a dry insert (e.g., for buffer tubes with no filling compound, etc.). In certain embodiments, one or more of the plurality of buffer tubes 110A-N may be filled with a suitable filling compound. For example, a filling compound may be positioned in the interstitial spaces between the optical fibers and/or in the interstitial spaces between the optical fibers and the inner wall of the buffer tube 110 (or any wrap formed around the optical fibers).

Although the cable 100 is illustrated as including loose buffer tubes 110A-N as optical fiber components, in other embodiments, the cable 100 may additionally or alternatively include other types of optical fiber components. For example, in certain embodiments, the cable 100 may include a plurality of microtubes formed around the CSM 105. A microtube may have an inner diameter that is sized to allow housed optical fibers to move relative to one another while preventing the optical fibers from crossing over or overlapping one another. In other words, the microtube may permit the optical fibers to flex or move as the cable is flexed or bent while simultaneously maintaining the position of each optical fiber relative to the other optical fibers. In certain embodiments, an inner diameter of the microtube may be determined based at least in part on the number of optical fibers to be positioned within the microtube, the outer diameters of the optical fibers, and/or the dimensions of any other internal components of the microtubes. As a result of using one or more microtubes, it may be possible to reduce or minimize the diameter of the cable 100 relative to cables that incorporate loose buffer tubes. In yet other embodiments, the cable 100 may include a plurality of tight buffered optical fibers positioned around the CSM 105. A tight buffer may be formed from any suitable material and/or combinations of materials and/or with any suitable thickness. In yet other embodiments, the cable 100 may include a combination of different types of fiber components. As set forth above, fiber components may be incorporated into any number of rings and/or other groupings positioned around the CSM 105.

With continued reference to FIG. 1, one or more optional outer layers 120 may be positioned between the plurality of buffer tubes 110A-N and the outer jacket 115. For example, a water blocking tape may be wrapped or positioned around the plurality of buffer tubes 110A-N. The water blocking tape may be formed from a wide variety of suitable materials and/or combinations of materials. For example, the water blocking tape may be formed as a polymer tape that includes superabsorbent powder ("SAP") or other suitable water absorbing and/or water blocking materials formed thereon or positioned between two polymeric layers. In other embodiments, one or more water swellable yarns may be wrapped or partially wrapped around the plurality of buffer tubes 110A-N and/or otherwise incorporated into the cable 100. As desired, water swellable and/or water blocking components may be provided in a continuous or discontinuous manner along a longitudinal length of the cable 100. Additionally or alternatively, water blocking material (e.g., water blocking dams) may be intermittently incorporated into a cable core.

In other embodiments, the one or more outer layers 120 may include a strength layer. For example, one or more strength yarns or other strength members may be wrapped around the plurality of buffer tubes 110A-N and any intervening layers (e.g., a water blocking tape, etc.). A wide variety of suitable strength yarns may be utilized as desired including, but not limited to, aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, etc. The outer layer(s) 120 may include a wide variety of other layers as desired, such as a flame retardant layer, etc.

As desired in various embodiments, the cable 100 may also include a suitable armor layer that provides mechanical protection for the cable 100. A wide variety of suitable types of armor layers may be utilized. In certain embodiments, the armor layer may be formed as a metallic armor layer, such as a corrugated steel armor layer. For example, a metallic tape (e.g., a steel tape, etc.) may be formed so as to interlock with itself and/or may be corrugated. In other embodiments, the armor layer may be formed as a dielectric armor layer from one or more dielectric or non-conductive materials, such as fiberglass, glass, epoxy, polymeric materials, etc. As desired, the armor layer may be coated with a polymer to promote adhesion, bonding, or a selected level of friction with the interior surface of the cable jacket 115. The armor layer may also be formed with a wide variety of suitable dimensions (e.g., any suitable thickness, etc.) and/or with any desired number and/or sizes of corrugations.

The outer jacket 115 may define an outer periphery of the cable 100. The jacket 115 may enclose the internal components of the cable 100, seal the cable 100 from the environment, and provide strength and structural support. The jacket 115 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the jacket 115 may also include flame retardant materials, smoke suppressant materials, carbon black or other suitable material for protection against exposure to ultraviolet ("UV") light, and/or other suitable additives. The jacket 115 may include a single layer or, alternatively, multiple layers of material (i.e., multiple layers of the same material, multiple layers of different materials, etc.). As desired, the jacket 115 may be characterized as an outer sheath, a casing, a circumferential cover, or a shell.

The jacket 115 may enclose one or more openings in which other components of the cable 100 are disposed. At least one opening enclosed by the jacket 115 may be referred to as a cable core, and any number of other cable components may be disposed in a cable core. In the cable 100 illustrated in FIG. 1, the CSM 105, the plurality of buffer tubes 110A-N and one or more optional components (e.g., strength members 155, an outer layer 120, etc.) may be situated within a cable core. A wide variety of other components may be situated within a cable core as desired, such as other transmission media, tight buffered optical fibers, various separators or dividers, spacers, inner jackets, etc. Indeed, a wide variety of different cable constructions may be utilized in accordance with various embodiments of the disclosure.

Additionally, the illustrated cable 100 has a circular or approximately circular cross-sectional profile. In other embodiments, other cross-sectional profiles (e.g., an elliptical or oval profile, etc.) and/or dimensions may be utilized as desired. In other words, the jacket 115 may be formed to result in any desired shape. The jacket 115 may also have a wide variety of dimensions, such as any suitable or desirable outer diameter and/or any suitable or desirable wall thickness. Additionally, in certain embodiments, the cable profile may be formed to facilitate a specific function and/or to facilitate installation of the cable. For example, a cable profile may facilitate clamping in aerial and/or other applications, etc., and the cable 100 may be designed to withstand a specified installation tensile loading and/or other suitable design parameters.

In certain embodiments, at least one "ripcord" may be incorporated into the cable 100, for example, within a cable core. A ripcord may facilitate separating the jacket 115 from other components of the cable 100. In other words, the ripcord may help open the cable 100 for installation or field service. A technician may pull the ripcord during installation in order to access internal components of the cable 100. A ripcord may be formed from a wide variety of suitable materials and/or with a wide variety of suitable dimensions.

In certain embodiments, one or more relatively rigid strength members (not shown) may be incorporated into the cable 100. For example, one or more strength rods may be embedded in the jacket 115. In certain embodiments, the jacket 115 may be formed or extruded around one or more strength members. Embedded strength members may be located at any desired points within the jacket 115. For example, strength members may be located on opposing lateral sides of a longitudinal axis of the cable 100. The strength members may enhance tensile strength of the cable 100. In other embodiments, one or more strength rods may be situated within a cable core. Indeed, a wide variety of strength member configurations may be utilized.

As desired, the cable 100 may be formed with a relatively small form factor, diameter, and/or cross-sectional area. In certain embodiments, the use of conductive components 125A-G in the CSM 105 may provide enhanced tensile strength for the cable 100, thereby allowing other strength layers or components to be removed from the cable 100 or reduced in thickness or size. In this regard, an overall diameter or size of the cable 100 may be reduced.

The cable 100 illustrated in FIG. 1 is provided by way of example only. Embodiments of the disclosure contemplate a wide variety of other cables and cable constructions. These other cables may include more or less components than the cable 100 illustrated in FIG. 1. Additionally, certain components may have different dimensions and/or be formed from different materials than the components illustrated in FIG. 1.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable, comprising:
  a central strength member comprising a plurality of longitudinally extending conductive components, each conductive component comprising:
    an inner conductor;
    a dielectric strength member formed around the inner conductor, the dielectric strength member having a tensile strength of at least 10,000 MPa; and
    an outer conductor formed around the dielectric strength member, the inner and outer conductor forming a balanced pair of conductors;
  a plurality of buffer tubes positioned around the central strength member, each of the plurality of buffer tubes housing at least one optical fiber; and
  an outer jacket surrounding the plurality of buffer tubes and the central strength member.

2. The cable of claim 1, wherein the dielectric strength member comprises a longitudinally extending cavity, and wherein the inner conductor is positioned within the cavity.

3. The cable of claim 1, wherein the dielectric strength member comprises one of glass reinforced plastic or basalt fiber.

4. The cable of claim 1, wherein the inner conductor has a first direct current resistance and the outer conductor has a second direct current resistance approximately equal to the first direct current resistance.

5. The cable of claim 1, wherein the plurality of conductive components are one of (i) helically stranded together or (ii) S-Z stranded together.

6. The cable of claim 1, wherein the plurality of conductive components comprises between four and fifty conductive components.

7. The cable of claim 1, wherein the central strength member further comprises:
a longitudinally extending wrap formed around the plurality of conductive components.

8. The cable of claim 1, further comprising:
one or more strength members positioned in the interstices between the plurality of conductive components.

9. A cable, comprising:
a longitudinally extending central strength member formed from a plurality of twisted components, each component comprising:
an inner conductor;
an outer conductor coaxially arranged around the inner conductor; and
a dielectric strength member positioned between the inner conductor and the outer conductor, the dielectric strength member comprising a tensile strength of at least 10,000 MPa;
a plurality of buffer tubes positioned around the central strength member, each of the plurality of buffer tubes housing at least one optical fiber; and
an outer jacket surrounding the plurality of buffer tubes and the central strength member.

10. The cable of claim 9, wherein the inner conductor and the outer conductor of each respective component forms a balanced transmission line.

11. The cable of claim 9, wherein the dielectric strength member comprises a longitudinally extending cavity, and
wherein the inner conductor is positioned within the cavity.

12. The cable of claim 9, wherein the dielectric strength member comprises one of glass reinforced plastic or basalt fiber.

13. The cable of claim 9, wherein the plurality of twisted components are one of (i) helically stranded together or (ii) S-Z stranded together.

14. The cable of claim 9, wherein the plurality of twisted components comprises between four and fifty components.

15. The cable of claim 9, further comprising:
one or more strength members positioned in the interstices between the plurality of twisted components.

16. The cable of claim 9, wherein the central strength member further comprises:
a longitudinally extending wrap formed around the plurality of twisted components.

17. A cable, comprising:
a central strength member comprising a plurality of longitudinally extending components, each component comprising:
a dielectric strength member comprising a tensile strength of at least 10,000 MPa and further comprising a longitudinally extending internal cavity;
an inner conductor positioned within the internal cavity; and
an outer conductor formed around the dielectric strength member,
wherein the inner and outer conductors form a balanced pair of conductors;
a plurality of buffer tubes positioned around the central strength member, each of the plurality of buffer tubes housing at least one optical fiber; and
an outer jacket surrounding the plurality of buffer tubes and the central strength member.

18. The cable of claim 17, wherein the dielectric strength member comprises one of glass reinforced plastic or basalt fiber.

19. The cable of claim 17, wherein the plurality of longitudinally extending components are one of (i) helically stranded together or (ii) S-Z stranded together.

20. The cable of claim 17, wherein the plurality of longitudinally extending components comprises between four and fifty components.

* * * * *